(12) United States Patent
Kuckelman et al.

(10) Patent No.: US 8,510,823 B2
(45) Date of Patent: Aug. 13, 2013

(54) SYSTEM AND METHOD FOR TESTING FUNCTIONALITY OF A FIREWALL

(75) Inventors: Mark J. Kuckelman, Long Beach, CA (US); Quang Dao, Granada Hills, CA (US); Jeffery Jay Logan, Redondo Beach, CA (US); Michael Alexander, Ft. Worth, TX (US)

(73) Assignee: Raytheon Company, Waltham, MA (US)

( * ) Notice: Subject to any disclaimer, the term of this patent is extended or adjusted under 35 U.S.C. 154(b) by 262 days.

(21) Appl. No.: 12/818,238

(22) Filed: Jun. 18, 2010

(65) Prior Publication Data
US 2011/0314536 A1 Dec. 22, 2011

(51) Int. Cl.
G06F 9/00 (2006.01)
G06F 15/16 (2006.01)
G06F 17/00 (2006.01)

(52) U.S. Cl.
USPC .......................................................... 726/12

(58) Field of Classification Search
USPC .......................................................... 726/12
See application file for complete search history.

(56) References Cited

U.S. PATENT DOCUMENTS

| | | | |
|---|---|---|---|
| 2003/0208616 A1* | 11/2003 | Laing et al. | 709/236 |
| 2007/0282951 A1 | 12/2007 | Selimis et al. | |
| 2009/0006841 A1* | 1/2009 | Ormazabal et al. | 713/152 |
| 2009/0205039 A1* | 8/2009 | Ormazabal et al. | 726/11 |

OTHER PUBLICATIONS

Send ICMP Nasty Garbage Packets to Network Hosts with sing Utility, Vivek Gite, Last Updated: Jan. 29, 2008, http://www.cyberciti.biz/tips/test-network-with-unix-linux-icmp-sing-tool.html.

Intrusion Detection FAQ: How can attacker use ICMP for reconnaissance? KoonYaw Tan, Last Viewed: Apr. 12, 2010, http://www.sans.org/security-resources/idfaq/icmp_misuse.php.

* cited by examiner

Primary Examiner — Kambiz Zand
Assistant Examiner — Stephen Sanders
(74) Attorney, Agent, or Firm — Pierce Atwood LLP; Joseph M. Maraia

(57) ABSTRACT

Described are computer-based methods and apparatuses, including computer program products, for testing functionality of a firewall. The testing the functionality of the firewall can include a method. The method can include selecting a plurality of valid message types, generating a percentage of valid and invalid messages from the plurality of valid message types, transmitting the plurality of valid and invalid messages to the firewall, receiving an indication of the firewall's handling of valid and invalid messages based on the transmitted message, and determining the functionality of the firewall from the received indication.

21 Claims, 9 Drawing Sheets

SYSTEM AND METHOD FOR TESTING FUNCTIONALITY OF A FIREWALL

FIELD OF THE INVENTION

The present invention relates generally to computer-based methods and apparatuses, including computer program products, for testing the functionality of a firewall.

BACKGROUND

The need to transfer data between security domains, typically in, the form of a network, is common both in industry and in government. Firewalls, such as email gateways, cross-domain solutions and other types of industry standard network edge protection devices, are examples of systems that address this need. These devices typically attempt to protect devices on an internal network from the larger internet by limiting or filtering network data. By controlling the flow of information across the network boundary, a firewall or other network edge device reduces the chances that a successful intrusion can be accomplished.

Connecting two or more domains that contain sensitive or confidential information adds additional requirements beyond integrity protection. A common scenario in U.S. and other government networks is that domains are separated based on the highest type of information approved to be transmitted over a network. To prevent unwanted disclosure, it is assumed that all data on these networks is the type at the highest level authorized for the network. This greatly reduces the level of trust placed in the devices attached to these networks and makes it practical to use commodity software. It also means that the networks must be kept strictly separated; even though one domain type of network, for example, might contain data only typed as domain A it is not possible for a device on a another domain type network to connect to the domain A network to receive this data.

Firewalls, such as cross-domain solutions (CDS), also called guards, are employed in scenarios where it is required that data be transmitted between domains in a controlled way. However, it is challenging, if not impossible, to test the firewalls between domains. Thus, a need exists in the art for improved testing of functionality of a firewall.

SUMMARY

One approach to testing functionality of a firewall is a method. The method includes selecting a plurality of valid message types and generating a percentage of valid and invalid messages from the plurality of valid message types. The method further includes transmitting the plurality of valid and invalid messages to the firewall and receiving an indication of the firewall's handling of valid and invalid messages based on the transmitted message. The method further includes determining the functionality of the firewall from the received indication.

Another approach to testing functionality of a firewall is a computer program product, tangibly embodied in an information carrier. The computer program product includes instructions being operable to cause a data processing apparatus to select a plurality of valid message types, generate a percentage of valid and invalid messages from the plurality of valid message types, transmit the plurality of valid and invalid messages to the firewall, receive an indication of the firewall's handling of valid and invalid messages based on the transmitted message, and determine the functionality of the firewall from the received indication.

Another approach to testing functionality of a firewall is a system. The system includes a message type selection module, a message generation module, a communication module, and a functionality determination module. The message type selection module is configured to select a plurality of valid message types. The message generation module is configured to generate a percentage of valid and invalid messages from the plurality of valid message types. The communication module is configured to transmit the plurality of valid and invalid messages to the firewall and receive an indication of the firewall's handling of valid and invalid messages based on the transmitted message. The functionality determination module is configured to determine the functionality of the firewall from the received indication.

Another approach to testing functionality of a firewall is a system. The system includes means for selecting a plurality of valid message types and means for generating a percentage of valid and invalid messages from the plurality of valid message types. The system further includes means for transmitting the plurality of valid and invalid messages to the firewall and means for receiving an indication of the firewall's handling of valid and invalid messages based on the transmitted message. The system further includes means for determining the functionality of the firewall from the received indication.

In other examples, any of the approaches above can include one or more of the following features.

In some examples, the step of receiving an indication includes receiving an acknowledgment that the message passed through the firewall and/or timing out responsive to the message not passing through the firewall.

In other examples, the step of determining the functionality of the firewall further includes comparing the transmitted message to the received indication.

In some examples, the method further includes updating a valid message counter if an acknowledgement is received for a valid message sent, updating the valid message counter if a time out is determined for an invalid message sent, updating an invalid message counter if the acknowledgement is received for the invalid message sent, and/or updating the invalid message counter if the time out is determined for the valid message sent.

In other examples, the method further includes prior to the transmitting packetizing the plurality of the valid and invalid messages and/or updating a valid packet counter and an invalid packet counter based on the packetizing the plurality of the valid and invalid messages.

In some examples, the generating the percentage of the valid and invalid messages from the plurality of the valid message types further includes automatically and iteratively generating the percentage of the valid and invalid messages from the plurality of the valid message types over a period of time.

In other examples, the generating the percentage of the valid and invalid messages from the plurality of the valid message types further includes generating the percentage of the valid and invalid messages from the plurality of the valid message types based on an illegal payload format, and/or an illegal header format associated with the plurality of valid message types.

In some examples, the step of generating the percentage of the valid and invalid messages includes inserting an illegal packet bit into a valid message to form an invalid message.

In other examples, the step of generating the percentage of the valid and invalid messages includes selecting a message type from a plurality of stored message types based on a random number and/or generating an invalid message based on the selected message type and the random number.

In some examples, the communication module is further configured to receive an acknowledgment that the message passed through the firewall and/or time out a response to the message, the time out of the response indicative of the message not passing through the firewall.

In other examples, the functionality determination module is further configured to compare the transmitted message to the received indication.

In some examples, the system further includes a valid message counter module. The valid message counter module can be configured to update a valid message counter if an acknowledgement is received for a valid message sent and/or update the valid message counter if a time out is determined for an invalid message sent.

In other examples, the system further includes an invalid message counter module. The invalid message counter can be configured to update an invalid message counter if the acknowledgement is received for the invalid message sent and/or update the invalid message counter if the time out is determined for the valid message sent.

In some examples, the communication module is further configured to, prior to the transmitting, packetize the valid and invalid message and/or update a valid packet counter and an invalid packet counter.

In other examples, the message generation module is further configured to automatically and iteratively generate the percentage of the valid and invalid messages from the plurality of the valid message types over a period of time.

In some examples, the message generation module is further configured to generate the percentage of the valid and invalid messages from the plurality of the valid message types based on an illegal payload format, and/or an illegal header format associated with the plurality of valid message types.

In other examples, the message generation module is further configured to insert an illegal packet bit into the valid message to form the invalid message.

In some examples, the message type selection module is further configured to select a message type from a plurality of stored message types based on a random number.

In other examples, the message generation module is further configured to generate an invalid message based on the selected message type and the random number.

In some examples, the firewall includes a network edge protection device, an email gateway, a cross-domain device, a packet filter device, an application gateway, and/or a proxy server.

The testing functionality of a firewall described herein can provide one or more of the following advantages. An advantage to the testing functionality of a firewall is that the automatic and iterative generation of both valid and invalid messages enables the testing to include various permutations of both valid and invalid messages, thereby increasing the efficiency of the testing process and increasing the likelihood of discovering issues with the configuration of the firewall. Another advantage to the testing functionality of a firewall is that the generation of both valid and invalid messages for the negative path and positive path testing enables a comprehensive testing strategy to be utilized, thereby increasing the dependability of the testing results.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Domains (e.g., a widget A domain, a human resources domain, a corporate network, a department network, a military network, etc.) should be protected to ensure that data is not improperly transferred between the domains (e.g., payroll data transferred from the human resources domain to the production domain, revenue forecasts transferred from the accounting domain to the human resources domain, etc.). Firewalls can be utilized to protect domains against the improper transfer of data between domains (e.g., stop the payroll data from be transferred to the production domain, deny all messages to/from a designated server, etc.). However, the firewalls have to be properly configured and tested to ensure that such improper data communication is prevented.

Firewall testing technology, as described herein, can be utilized to test functionality of the firewalls. The firewall testing technology can include the use of valid messages (e.g., a valid transfer control protocol message, a valid data transfer request, a valid accounting database message, etc.) and/or invalid messages (e.g., a transfer control protocol message with an invalid header, a data transfer request with an invalid authentication code, an accounting database message with an invalid source address, etc.) to test the functionality of the firewalls. The firewall testing technology can advantageously automatically and iteratively generate the invalid messages based on a plurality of message types, thereby increasing the efficiency of the testing methodology and reducing pathways for the unauthorized transfer of data between domains. The firewall testing technology can utilize indications, received from the firewalls and/or computing devices associated with the domain, to determine the functionality of the firewalls (e.g., properly configured to email messages, improperly configured for database queries, etc.).

Figure 1:
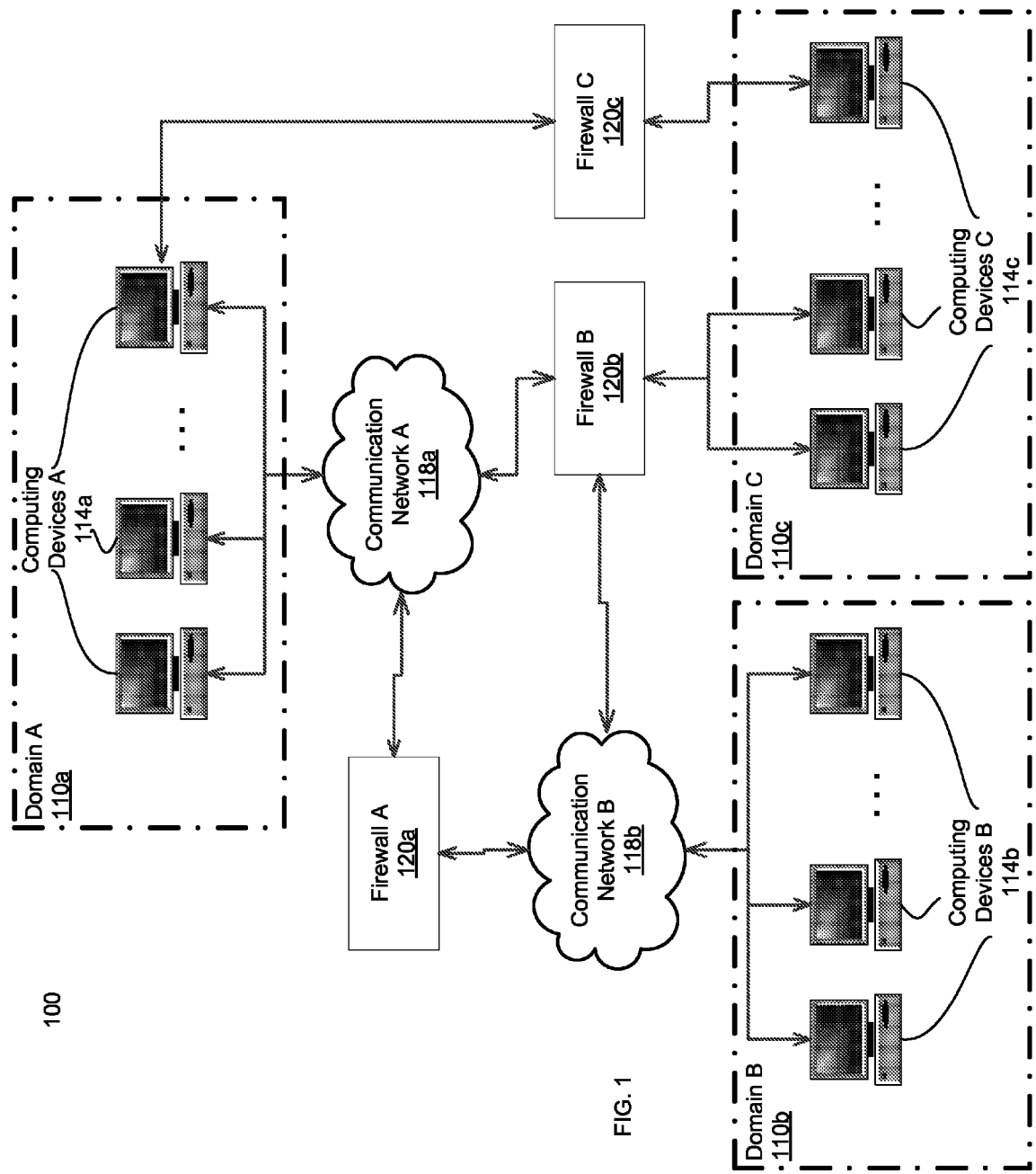
FIG. 1 is a block diagram of an exemplary system with firewalls.

FIG. 1 is a block diagram of an exemplary system 100 with firewalls A 120a, B 120b, and C 120c. The system 100 includes domains A 110a, B 110b, and C 110c (generally domains 110), communication networks A 118a and B 118b, and the firewalls A 120a, B 120b, and C 120c (generally firewalls 120). Each of the domains 110 includes a plurality of computing devices A 114a, B 114b, and C 114c, respectively.

In some examples, the system 100 illustrates an exemplary cross-domain system. Each of the domains 110 can be, for example, designated as a domain type (e.g., engineering domain, accounting domain, widget A domain, widget B domain, production domain, etc.). The firewalls 120 can be, for example, utilized to control the transfer of data between the domains 110, thereby protecting the domains 110 from unauthorized data transfer (e.g., transfer of data between a high domain security classification and a low domain security classification, transfer of accounting data from the accounting domain to the production domain, transfer of data from widget A domain to the human resources domain, etc.).

For example, the computing devices B 114*b* can communicate with the computing devices A 114*a* via the firewall A 120*a* and the communication networks B 118*b* and A 118*a*. In this example, the firewall A 120*a* can control the transfer of data between the domains B 110*b* and A 110*a* utilizing one or more rules associated with the transfer of data (e.g., allow emails between domains, deny transfer of payroll data from domain A 110*a* to domain B 110*b*, allow transfer of payroll data from domain B 110*b* to domain A 110*a*, etc.).

Although FIG. 1 illustrates the plurality of computing devices 114 in each domain 110, the domains 110 can include any number and/or configuration of communication networks and/or computing devices. For example, the domain A 110*a* includes twenty communication networks and each communication network includes between one hundred and two hundred computing devices (e.g., personal computers, servers, mobile devices, etc.).

Figure 2:
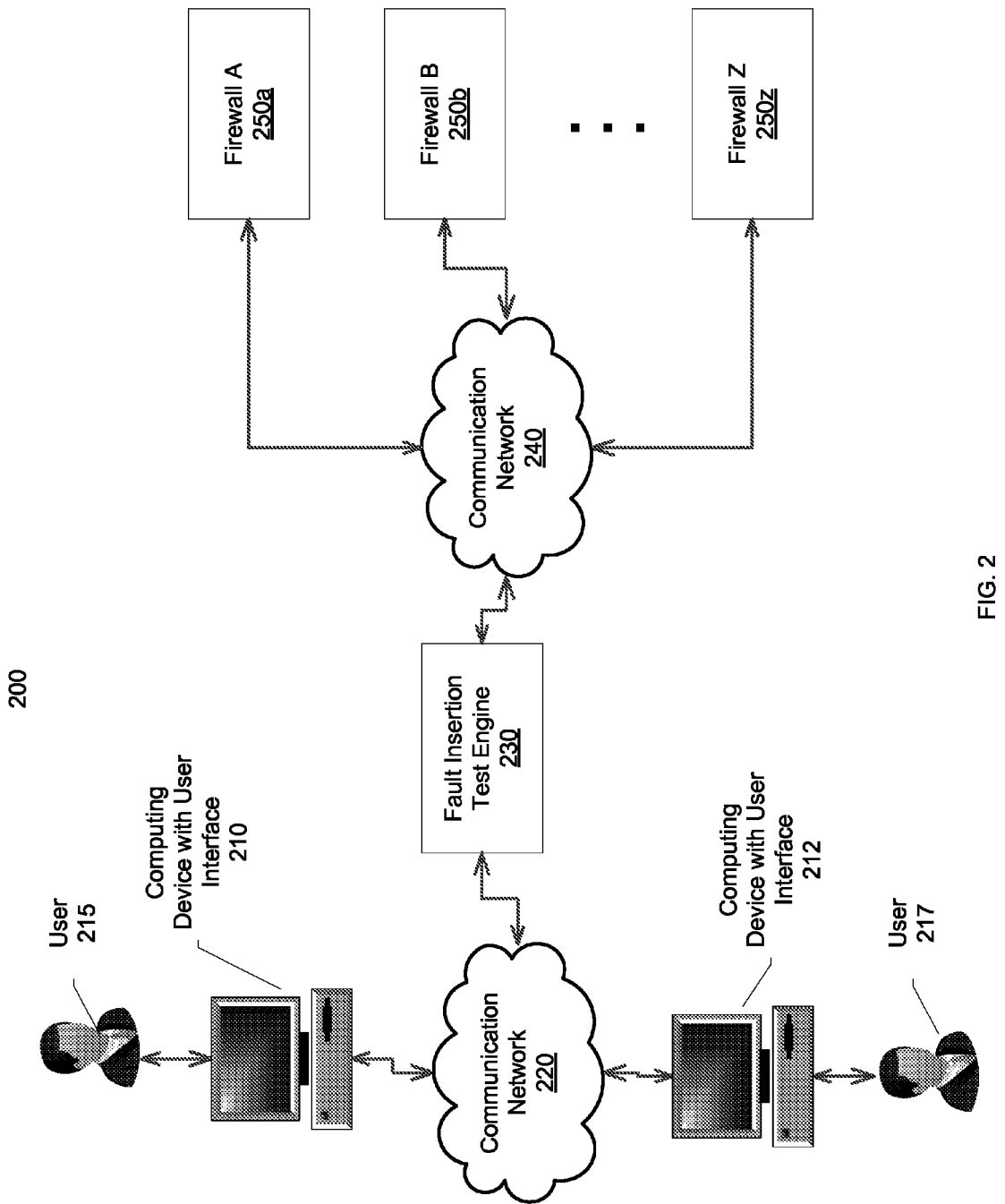
FIG. 2 is a block diagram of an exemplary system with a fault insertion test engine.

FIG. 2 is a block diagram of an exemplary system 200 with a fault insertion test engine 230. The system 200 includes a computing device with a user interface 210, a computing device with a user interface 212, a communication network 220, the fault insertion test engine 230, a communication network 240, firewalls A 250*a*, a firewall B 250*b* through Z 250*z* (generally firewalls 250). In general, a user 215/217 utilizes the computing device with the user interface 210/212 to interact with the fault insertion test engine 230 (e.g., initiate a cross domain rule testing process, input packet counts, etc.). The fault insertion test engine 230 can, for example, receive inputs from a plurality of users and/or test the functionality of a plurality of firewalls during any given time period.

The fault insertion test engine 230 tests the firewalls 250 by transmitting a plurality of valid and invalid messages to/through the firewalls 250 (e.g., the destinations of some messages are the firewall, the destinations of other messages are computing devices within the domain protected by the firewall, etc.). The fault insertion engine 230 can, for example, direct the valid and invalid message to one of the firewalls 250.

For example, the fault insertion test engine 230 generates an invalid transmission control protocol (TCP) message (e.g., a TCP message with an invalid header, a TCP message with a randomly inserted bit in the TCP message, a TCP message with an invalid body, etc.). The fault insertion test engine 230 can, for example, process the messages to form a plurality of packets for each message. For example, the fault insertion test engine 230 processes the invalid TCP message to form a plurality of TCP packets (e.g., ten TCP packets, forty TCP packets, etc.).

The fault insertion test engine 230 receives indications from the firewalls 250, respectively, in response to the plurality of valid and invalid messages. The indications can, for example, include an acknowledgment message, no response (e.g., a time-out after transmitting the message, an out-of-sequence response to another message, etc.), a resend message, an error message (e.g., message rejected, message invalid, etc.), and/or any other type of network transmission.

The fault insertion test engine 230 determines functionality of each of the firewalls 250 based on the received indications. For example, if the fault insertion engine 230 receives an acknowledgment message for a valid message from the firewall A 250*a*, the fault insertion engine 230 determines that the functionality of the firewall A 250*a* is setup for a response to a valid message (e.g., properly configured, improperly configured, etc.). As another example, if the fault insertion engine 230 receives an acknowledgment message for an invalid message from the firewall A 250*a*, the fault insertion engine 230 determines that the functionality of the firewall A 250*a* is setup for an incorrect response to an invalid message (e.g., improperly configured, properly configured, etc.).

In some examples, the firewalls 250 include a network edge protection device, an email gateway, a cross-domain device (e.g., a domain guard device, a domain bridge device, etc.), a packet filter device, an application gateway, a proxy server, and/or any other type of network device (e.g., a circuit-level gateway, an application filter device, a packet caching device, etc.).

Although FIG. 2 illustrates the fault insertion test engine 230 and the computing devices with user interfaces 210 and 212 as separate components of the system 200, the fault insertion test engine 230 and a computing device with a user interface can be integrated into a single computing device. For example, the computing device is a personal computer with the user interface and the fault insertion test engine. In other examples, the fault insertion test engine 230 is a software component executed on a web server and the computing device with the user interface is a personal computer with a web browser to interface with the web server for user input and/or user output.

Although FIG. 2 illustrates the fault insertion test engine 230 and the firewalls 250, the system 200 can include any number of fault insertion engines (e.g., four fault insertion engines, ten fault insertion engines, etc.) and/or firewalls. For example, a company network includes ten firewalls connecting communication networks with other communication networks (e.g., accounting communication network with engineering communication network, domain A communication network with domain B communication network, etc.). In this example, a fault insertion test engine is associated with each firewall for testing of the functionality of the firewall.

Figure 3:
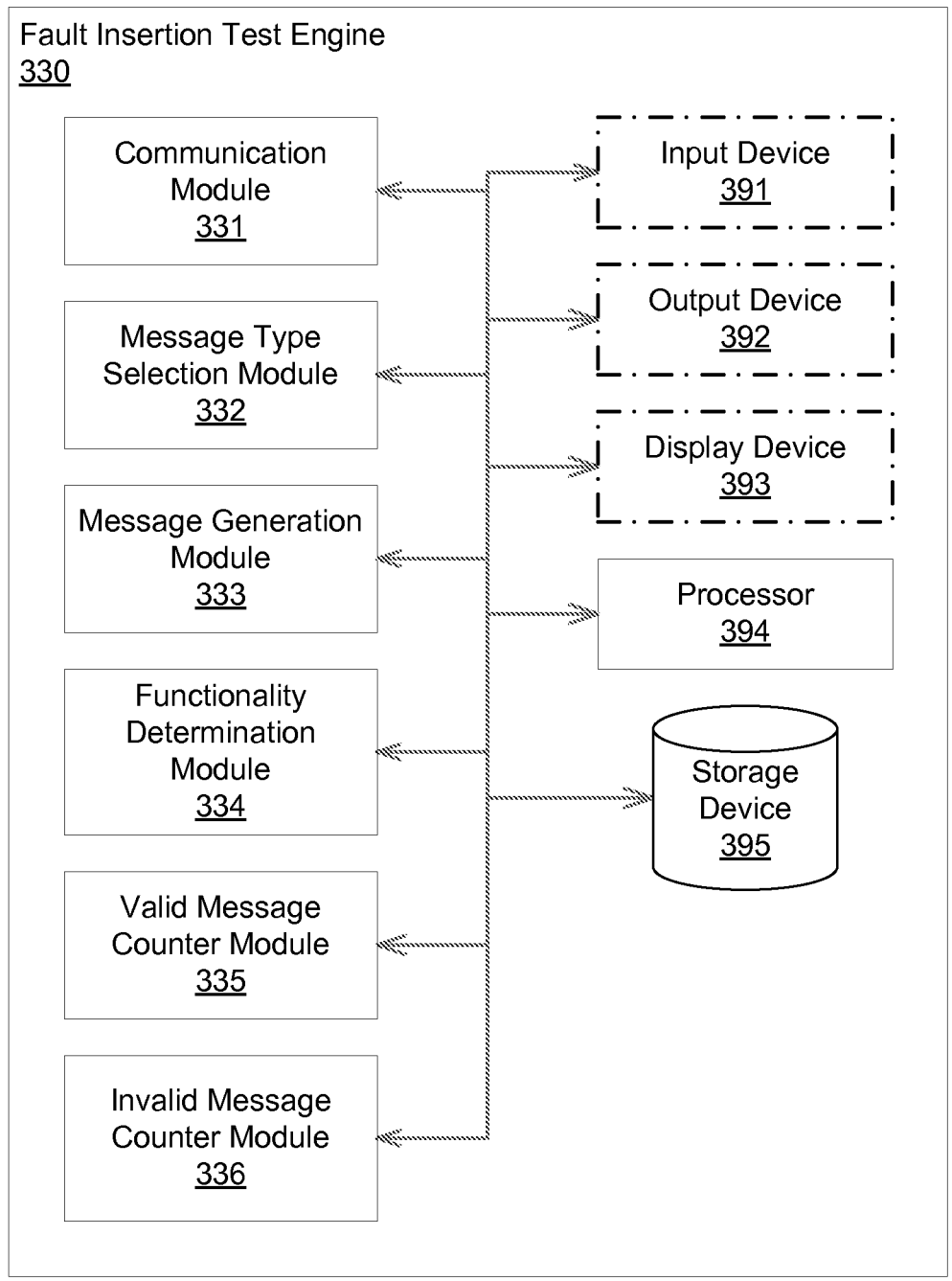
FIG. 3 is a block diagram of an exemplary fault insertion test engine.

FIG. 3 is a block diagram of an exemplary fault insertion test engine 330. The fault insertion test engine 330 includes a communication module 331, a message type selection module 332, a message generation module 333, a functionality determination module 334, a valid message counter module 335, an invalid message counter module 336, an input device 391, an output device 392, a display device 393, a processor 394, and a storage device 395. The modules and devices described herein can, for example, utilize the processor 394 to execute computer executable instructions and/or include a processor to execute computer executable instructions (e.g., an encryption processing unit, a field programmable gate array processing unit, etc.). It should be understood that the fault insertion test engine 330 can include, for example, other modules, devices, and/or processors known in the art and/or varieties of the illustrated modules, devices, and/or processors.

The communication module 331 communicates data and/or information to/from the fault insertion test engine 330. The communication module 331 can, for example, transmit the plurality of valid and invalid messages to the firewall. The communication module 331 can, for example, receive an indication of the firewall's handling of valid and invalid messages based on the transmitted message. The indication can be an acknowledgment that the message passed through the firewall and/or time out a response to the message, the time out of the response indicative of the message not passing through the firewall. The communication module 331 can, for example, prior to the transmitting, packetize the valid and invalid message and/or update a valid packet counter and an invalid packet counter.

The message type selection module 332 selects a plurality of valid message types. The message type selection module 332 can, for example, select a message type from a plurality of stored message types based on a random number (e.g., selection based on the random number, selection based on a function of the random number, etc.). The valid message types can include, for example, any type of communication protocol and/or standard including, but not limited to, transmission control protocol (TCP), user datagram protocol (UDP), internet protocol (IP), internet control message protocol (ICMP), file transfer protocol (FTP), real-time transport protocol (RTP), and/or any other message type. In other examples, the valid message types include user-defined message types (e.g., user-defined TCP message type, user-defined accounting message type, user-defined domain A message type, etc.).

The message generation module 333 generates a percentage of valid and invalid messages from the plurality of valid message types. The message generation module 333 can, for example, automatically and iteratively generate the percentage of the valid and invalid messages from the plurality of the valid message types. The automatic and iterative generation of the valid and invalid messages advantageously enables the comprehensive testing of the firewall with minimum user intervention, thereby removing the user from creating test cases of invalid messages and allowing the fault insertion test engine 330 to generate various permutations of test cases for a holistic test strategy. In some examples, the message generation module 333 can generate the percentage of the valid and invalid message over a period of time (e.g., generate ten thousand messages over twenty-four hours, generates thirty thousand messages over one week, etc.) based on user input and/or automated input.

In other examples, the message generation module 333 generates the percentage of the valid and invalid messages from the plurality of the valid message types based on an illegal payload format and/or an illegal header format associated with the plurality of valid message types. The message generation module 333 can, for example, insert an illegal packet bit into the valid message to form the invalid message. In some examples, the message generation module 333 generates an invalid message based on the selected message type and a random number.

In other examples, a random number module (not shown) can generate a random number and/or the message generation module 333 generates an invalid message from a valid message based on the random number. For example, the random number module generates the random number seed (in this example, four) and the message generation module 333 modifies the valid message to form the invalid message (e.g., remove every fourth bit in the valid message, reverses every fourth bit –0 to 1 or 1 to 0, etc.) The utilization of the random number in the generation of the invalid message advantageously enables the testing of the firewall to expand beyond user-generated invalid messages, thereby enabling a comprehensive testing of various permutations of invalid messages and increasing the thoroughness of the testing methodology.

The functionality determination module 334 determines the functionality of the firewall from the received indication. The functionality determination module 334 can, for example, compare the transmitted message to the received indication (e.g., is the received indication a valid acknowl-edgment message for the transmitted message, is the received indication an error message associated with the transmitted message, etc.).

The valid message counter module 335 updates a valid message counter if an acknowledgement is received for a valid message sent and/or updates the valid message counter if a time out is determined for an invalid message sent.

The invalid message counter module 336 updates an invalid message counter if the acknowledgement is received for the invalid message sent and/or updates the invalid message counter if the time out is determined for the valid message sent.

The input device 391 receives information associated with the fault insertion test engine 330 (e.g., instructions from a user, instructions from another computing device, etc.) from a user (not shown) and/or another computing system (not shown). The input device 391 can include, for example, a keyboard, a scanner, etc. The output device 392 outputs information associated with the fault insertion test engine 330 (e.g., information to a printer (not shown), information to a speaker, etc.).

The display device 393 displays information associated with the fault insertion test engine 330 (e.g., status information, counter information, network information, etc.). The processor 394 executes the operating system and/or any other computer executable instructions for the fault insertion test engine 330 (e.g., executes applications, etc.).

The storage device 395 stores network information and/or counter information (e.g., fail counter, received counter, etc.). The storage device 395 can store information and/or any other data associated with the fault insertion test engine 330. The storage device 395 can include a plurality of storage devices and/or the fault insertion test engine 330 can include a plurality of storage devices (e.g., a message storage device, a counter storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
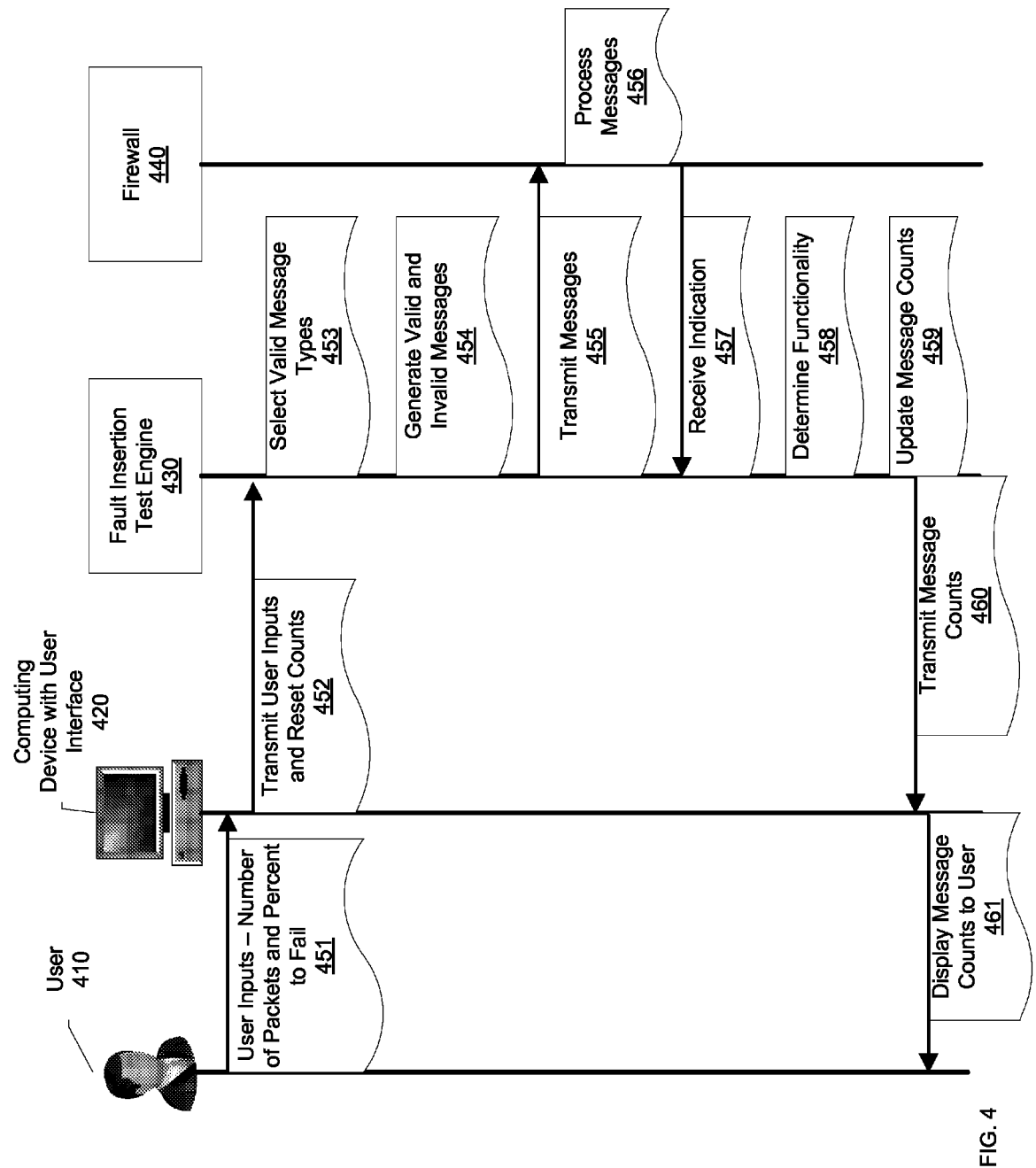
FIG. 4 is an exemplary flow diagram for testing functionality of a firewall.

FIG. 4 is an exemplary flow diagram 400 for testing functionality of a firewall 440. A user 410 utilizes a computing device with a user interface 420 to input (451) user inputs (e.g., number of packets, percent to fail, time period for test, retry period, etc.). Table 1 illustrates exemplary user input.

TABLE 1

Exemplary Message Types and Selection.

| Number of Packets | Percent to Fail | Start Time for Test |
|---|---|---|
| 10,000 | 84% | 6:00 am |
| 42,322 | 20% | 1:00 am |
| 452 | 45% | 4:00 pm |

The computing device 420 transmits (452) the user input to a fault insertion test engine 430 and resets (452) counters associated with the test (e.g., initialize new counters, reset existing counters, etc.). The fault insertion test engine 430 selects (453) valid message types from a plurality of message types. Table 2 illustrates exemplary message types and an exemplary selection of message types.

TABLE 2

Exemplary Message Types and Selection.

| Message Types | Selection |
|---|---|
| User-Defined Accounting Protocol | |
| User-Defined Domain C Protocol | Selected |
| Vendor-Specific Protocol | |
| Transmission Control Protocol (TCP) | |
| User-Defined TCP | |
| Routing Information Protocol (RIP) | |
| Simple Mail Transfer Protocol (SMTP) | |
| User-Defined Message Passing Interface (MPI) Protocol | |
| Real-time Transport Protocol (RTP) | |
| User-Defined RTP | |
| Border Gateway Protocol (BGP) | |
| Hypertext Transfer Protocol (HTTP) | Selected |
| Internet Control Message Protocol (ICMP) | |

Although Table 2 illustrates exemplary message types, the technology described herein can utilize any type of message type (e.g., an industry standard message type, a message type at specified network layer, a user-defined message type, a vendor-specific message type, etc.) and/or any combination of parts of message types (e.g., parts from a TCP message type and parts from an IP message type, parts from a user-defined message type and parts from a RTP message type, etc.).

For example, a user-defined message type C includes eleven fields. In this example, ten fields in the user-defined message type C include standard TCP fields (e.g., source IP address, destination IP address, etc.) and the eleventh field includes a user-defined field. The user-defined field can be, for example, pre-defined to populate a specified field, pre-defined to be an extra field (e.g., fake IP address, next destination address, etc.) and/or dependent on another field. For example, a field is dependent on another field and is an integer between 8 and 122, unless the other field is a "U", and in that case, the field is between 8 and 100.

As another example, a user-defined accounting protocol (e.g., custom designed protocol, variation of standard protocol, etc.) is defined for the communication between an accounts receivable database and an accounts, payable database. In this example, the technology described herein can generate valid and invalid messages based on the user-defined accounting protocol to test the functionality of a firewall associated with an accounting domain. The user can, for example, input information defining the user-defined accounting protocol (e.g., number of fields, content of fields, content of payload, etc.) and/or the fault insertion test engine 430 can define the user-defined accounting protocol based on information from the domain (e.g., monitoring packets on a network associated with the domain, monitoring packets transmitted to/from a firewall associated with the domain, etc.).

The fault insertion test engine 430 generates (454) valid and invalid messages from the selected message types. Table 3 illustrates exemplary valid and invalid messages.

TABLE 3

Exemplary Messages.

| Message Identifier | Message Type | Status |
|---|---|---|
| AB432532 | User-Defined Domain C Protocol | Valid |
| BC2345AB | HTTP | Valid |
| BC2345AC | HTTP | Invalid |
| AB432533 | User-Defined Domain C Protocol | Invalid |
| BC2345AD | HTTP | Valid |

TABLE 3-continued

Exemplary Messages.

| Message Identifier | Message Type | Status |
|---|---|---|
| BC2345AG | HTTP | Valid |
| AB432534 | User-Defined Domain C Protocol | Invalid |

The fault insertion test engine 430 transmits (455) the valid and invalid messages to a firewall 440. The firewall 440 processes (456) the valid and invalid messages (e.g., rejects a message, allows a message through the firewall 440, generates and transmits an acknowledge message, etc.). The fault insertion test engine 430 receives (457) an indication. The indication can be, for example, received from the firewall 440 and/or associated with the firewall 440. Table 4 illustrates exemplary indications receives by the fault insertion test engine 430.

TABLE 4

Exemplary Indications.

| Indicator | Message Identifier | Message Type | Status |
|---|---|---|---|
| Acknowledge Receipt from Internal Database Server (not shown) | AB432532 | User-Defined Domain C Protocol | Valid |
| Acknowledge Receipt from Internal Web Server (not shown) | BC2345AB | HTTP | Valid |
| Acknowledge Receipt from Firewall 440 with notification of invalid HTTP message | BC2345AC | HTTP | Invalid |
| Time-out of two minutes from transmission | AB432533 | User-Defined Domain C Protocol | Invalid |
| Time-out of one minute from transmission | BC2345AD | HTTP | Valid |
| Acknowledge Receipt from Internal Web Server | BC2345AG | HTTP | Valid |
| Time-out of four minutes from transmission | AB432534 | User-Defined Domain C Protocol | Invalid |

The fault insertion test engine 430 determines (458) functionality of the firewall 440 based on the received indications. In some examples, the fault insertion test engine 430 determines (458) if the firewall 440 is properly configured to process invalid messages (e.g., does the firewall 440 reject invalid User-Defined Domain C Protocol messages, does the firewall 440 not allow invalid HTTP messages through to internal web servers, etc.). Table 5 illustrates exemplary functionality determinations for the firewall 440.

TABLE 5

Exemplary Functionality.

| Functionality | Indicator | Message Identifier | Message Type | Status |
|---|---|---|---|---|
| OK - User-Defined Domain C Protocol Valid Message Setup | Acknowledge Receipt from Internal Database Server (not shown) | AB432532 | User-Defined Domain C Protocol | Valid |
| OK - HTTP Valid Message Setup | Acknowledge Receipt from Internal Web Server (not | BC2345AB | HTTP | Valid |

TABLE 5-continued

Exemplary Functionality.

| Functionality | Indicator | Message Identifier | Message Type | Status |
|---|---|---|---|---|
| ERROR - HTTP Invalid Message Setup | shown) Acknowledge Receipt from Firewall 440 with notification of invalid HTTP message | BC2345AC | HTTP | Invalid |
| OK - User-Defined Domain C Protocol Invalid Message Setup | Time-out of two minutes from transmission | AB432533 | User-Defined Domain C Protocol | Invalid |
| ERROR - HTTP Valid Message Setup | Time-out of one minute from transmission | BC2345AD | HTTP | Valid |
| OK - HTTP Valid Message Setup | Acknowledge Receipt from Internal Web Server | BC2345AG | HTTP | Valid |
| OK - User-Defined Domain C Protocol Invalid Message Setup. | Time-out of four minutes from transmission | AB432534 | User-Defined Domain C Protocol | Invalid |

The fault insertion test engine 430 updates (459) message counts based on the determined functionality and/or the received indications. Table 6 illustrates exemplary message counts. In this example, the send valid counter is the number of valid messages transmitted, the received valid counter is the number of received indicators corresponding to valid messages transmitted, the send invalid counter is the number of invalid messages transmitted, and the received invalid counter is the number of received indicators corresponding to invalid message transmitted. In this example, the tests, identified by the test identifier, can be, for example, transacted at different times/dates and/or over different times/dates (e.g., a percentage of the packets every hour for two days, half the packets at 8:00 am and the other half of the packets at 4:00 pm, etc.).

TABLE 6

Exemplary Message Counts.

| Test Identifier | Send Valid Counter | Received Valid Counter | Send Invalid Counter | Received Invalid Counter |
|---|---|---|---|---|
| A1 | 12,345 | 12,342 | 2,655 | 1,204 |
| A2 | 150,000 | 148,224 | 50,000 | 49,342 |
| B1 | 452 | 452 | 548 | 523 |
| B4 | 10 | 10 | 20 | 20 |
| C3 | 1,231,452 | 1,231,451 | 434,213 | 434,001 |

The fault insertion test engine 430 transmits (460) the updated message counts to the computing device 420. The computing device 420 displays (461) the updated message counts to the user 410 utilizing the user interface and/or the display device.

In other examples, the fault insertion test engine 430 can utilize the functionality of the firewall 440 to automatically generate configuration modifications for the firewall 440 (e.g., an access control change, a network processing rule addition, etc.). The fault insertion test engine 430 and/or another computer device can, for example, apply the configuration modifications to the firewall 440 based on automated rules (e.g., update all HTTP rule changes, admin verification required for SMTP rule changes, etc.)

Figure 5A:
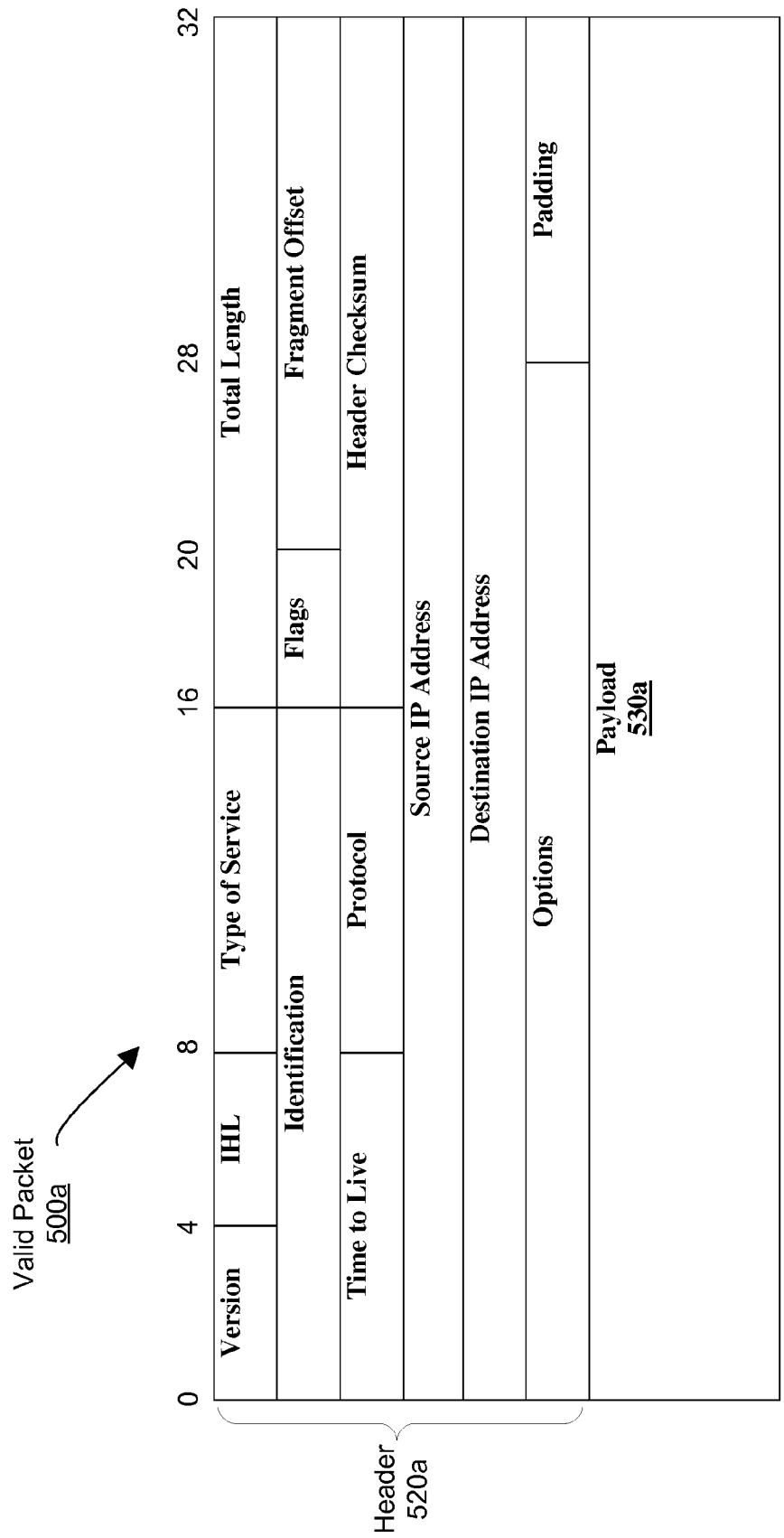
FIGS. 5A-5C illustrate exemplary packets.

FIG. 5A illustrates an exemplary valid packet 500a of a specified message type (in this example, an IP packet). The valid packet 500a includes a header 520a and a payload 530a.

Figure 5B:
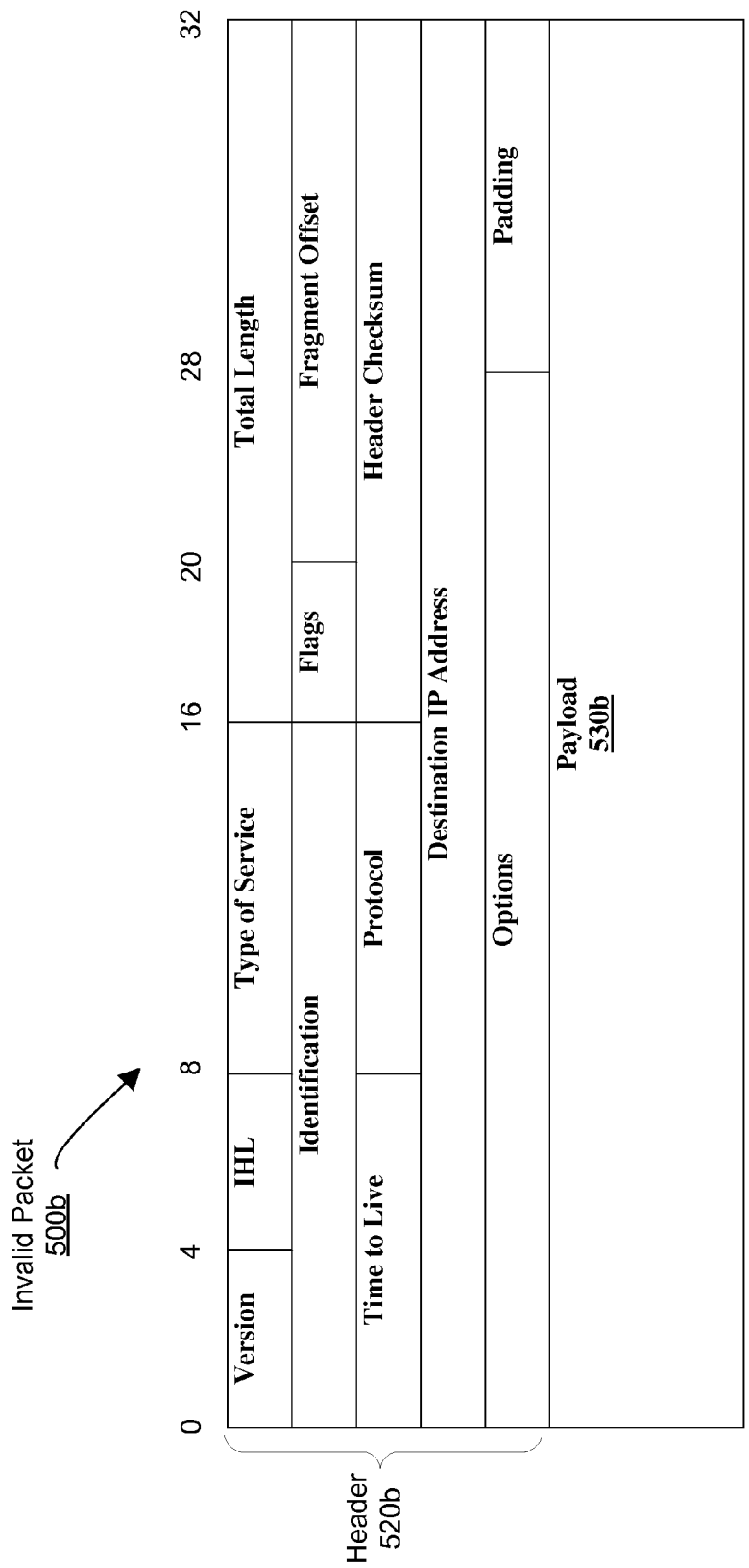

FIG. 5B illustrates an exemplary invalid packet 500b of a specified message type (in this example, an IP packet). The invalid packet 500b includes a header 520b and a payload 530b. In this example, the invalid packet 500b is missing a source IP address in the header 520b.

Figure 5C:
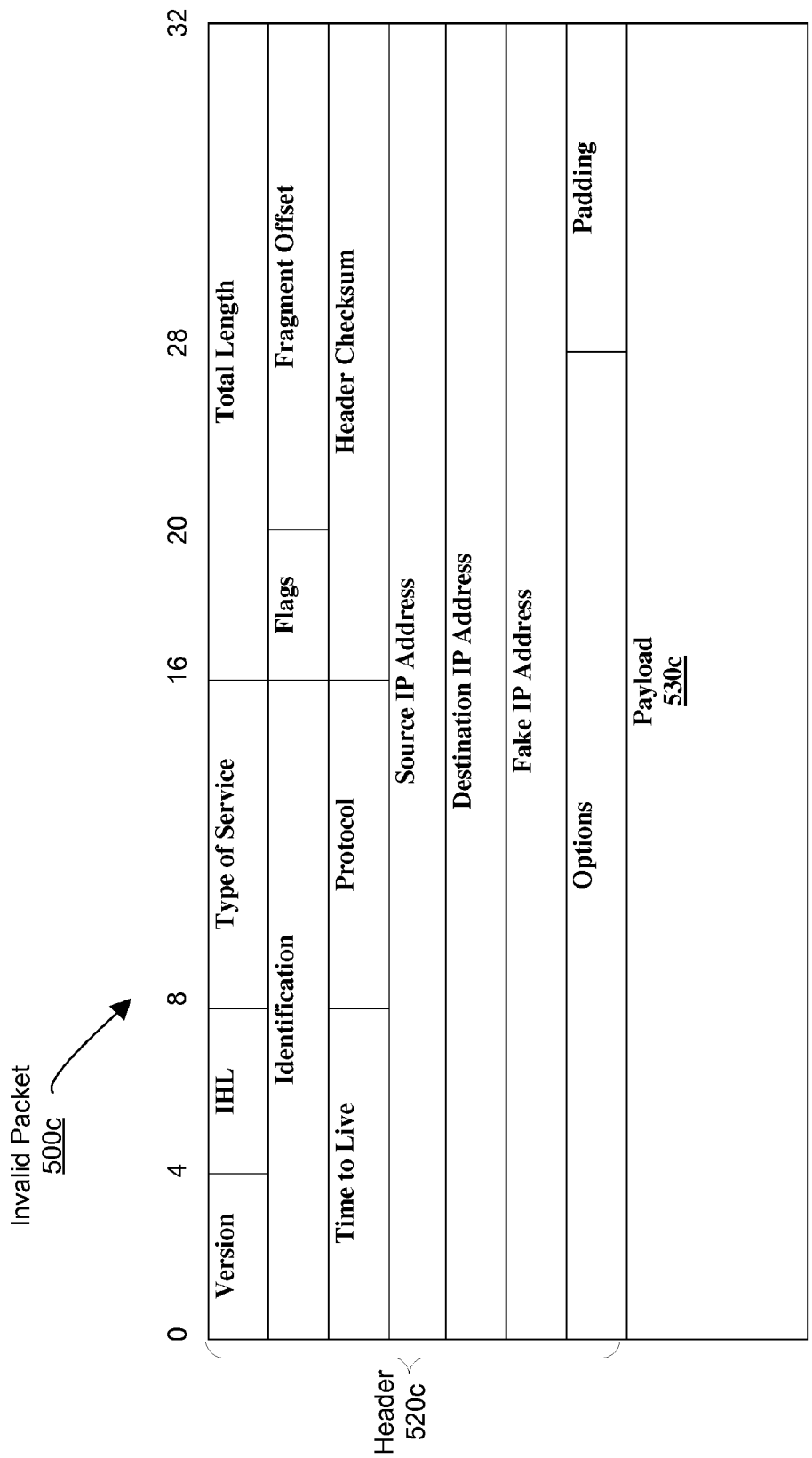

FIG. 5C illustrates an exemplary invalid packet 500c of a specified message type (in this example, an IP packet). The invalid packet 500c includes a header 520c and a payload 530c. In this example, the invalid packet 500c includes a fake IP address in the header 520c.

Figure 6:
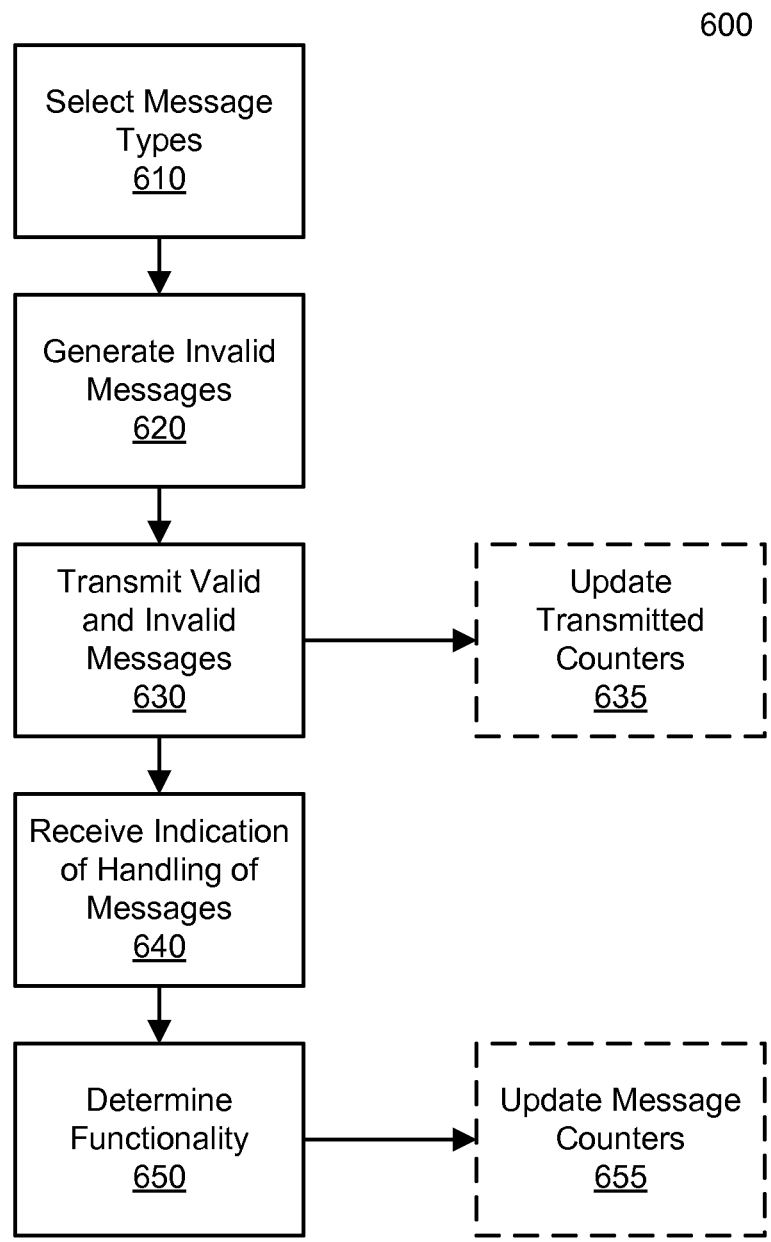
FIG. 6 is a flowchart of an exemplary process for testing functionality of a firewall.

FIG. 6 is a flowchart 600 of an exemplary process for testing functionality of a firewall utilizing the fault insertion test engine 330 of FIG. 3. The message type selection module 332 selects (610) a plurality of valid message types. The message generation module 333 generates (620) a percentage of valid and invalid messages from the plurality of valid message types. The communication module 331 transmits (630) the plurality of valid and invalid messages to the firewall. The communication module 331 receives (640) an indication of the firewall's handling of valid and invalid messages based on the transmitted message. The functionality determination module 334 determines (650) the functionality of the firewall from the received indication.

In other examples, the communication module 331 updates (635) a transmitted counters based on the transmission of the plurality of valid and invalid messages (e.g., increment the counter based on every message, increment a valid counter based on every valid message, increment an invalid counter based on every invalid message, etc.).

In some examples, the valid message counter module 335 updates (655) a valid message counter if an acknowledgement is received for a valid message sent and/or updates (655) the valid message counter if a time out is determined for an invalid message sent (e.g., increment counter, increment acknowledge counter, etc.). In other examples, the invalid message counter module 336 updates (655) an invalid message counter if the acknowledgement is received for the invalid message sent and/or updates (655) the invalid message counter if the time out is determined for the valid message sent (e.g., increment counter, increment acknowledge counter, etc.).

Figure 7:
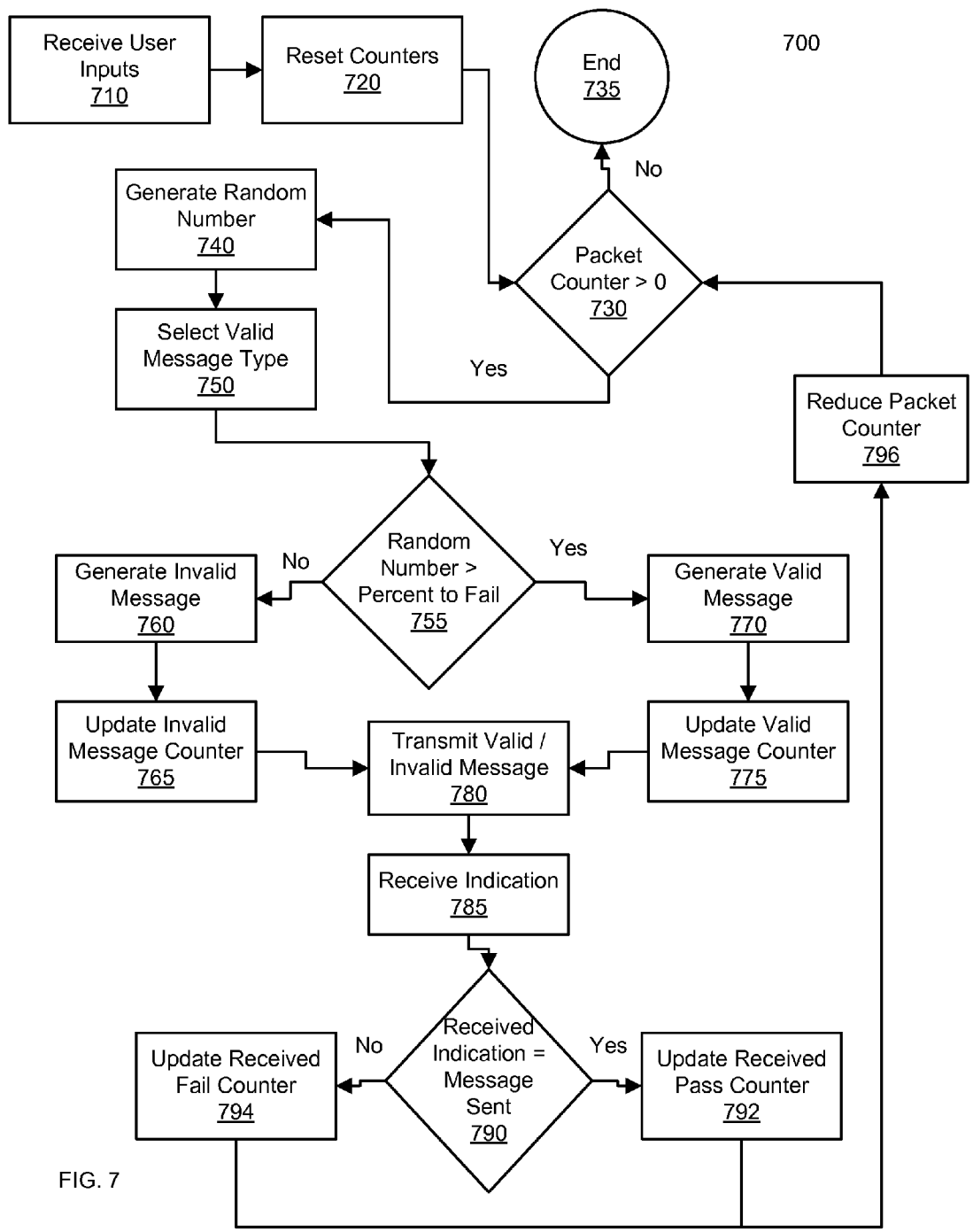
FIG. 7 is another flowchart of an exemplary process for testing functionality of a firewall.

FIG. 7 is another flowchart 700 of an exemplary process for testing functionality of a firewall utilizing the fault insertion test engine 330 of FIG. 3. The communication module 331 receives (710) user inputs from a user via a user interface associated with a computing device and/or via a web interface associated with the fault insertion test engine 330 (e.g., total messages, percent to fail, message type, etc.). The communication module 331, the valid message counter module 335, and/or the invalid message counter module 336 reset (720) the counters (e.g., total packets, send valid packets, received valid packets, send invalid packets, received invalid packets, etc.). The packet counter module (not shown) sets a packet counter based on the user input (e.g., 10,000 messages, 1,000 messages, etc.).

The packet counter module (not shown) checks (730) the packet counter to determine if the packet counter is greater than zero. If the packet counter is not greater than zero, the process ends (735). If the packet counter is greater than zero, the random generator module (not shown) generates (740) a random number.

The message type selection module 332 selects (750) a message type. For example, the message type selection module 332 selects the message type from a plurality of stored message types (e.g., automatically generated based on a user input, automatically generated based on the selected message type, manually inputted by the user, etc.). In some examples, the message type selection module 332 selects (750) the message type from a plurality of stored message types based on the random number.

The message generation module 333 determines (755) if the random number is greater than the user input percent to fail. If the random number is greater than the user input percent to fail, the message generation module 333 generates (770) a valid message based on the selected message type and the valid message counter module 335 updates (775) the valid message counter. If the random number is not greater than the user input percent to fail, the message generation module 333 generates (760) an invalid message based on the selected message type (e.g., insert a random bit into a valid message, remove information in a valid message, etc.) and the invalid message counter module 336 updates (765) the invalid message counter.

The communication module 331 transmits (780) the valid and/or invalid messages to the firewall. The communication module 331 receives (785) an indication of the firewall's handling of valid and invalid messages based on the transmitted message. The functionality determination module 334 determines (790) the functionality of the firewall from the received indication. If the received indication is associated with the transmitted message, the valid message counter module 335 or the invalid message counter module 336 updates (792) the received pass counter for the valid messages or the invalid messages, accordingly. If the received indication is not associated with the transmitted message, the valid message counter module 335 or the invalid message counter module 336 updates (794) the received fail counter for the valid messages or the invalid messages, accordingly. After the update of the respective counters, the packet counter module reduces the packet counter (796) (in this example, by one) and checks (730) the packet counter to determine if the packet counter is greater than zero.

In some examples, the fault insertion test engine enables an automated and iterative testing strategy via the automated process of generating invalid messages and/or the iterative process of generating a plurality of different invalid messages. The automated and iterative testing strategy can, for example, advantageously enables a holistic testing plan of both valid and invalid messages and efficient testing of negative paths associated with the firewall (e.g., negative paths to the firewall, negative paths through the firewall, etc.).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for testing functionality of a firewall, the method comprising:
    selecting a plurality of valid message types;
    generating a percentage of valid and invalid messages from the plurality of valid message types;
    transmitting the plurality of valid and invalid messages to the firewall;
    receiving an indication of the firewall's handling of valid and invalid messages based on the transmitted message; and
    determining the functionality of the firewall from the received indication.

2. The method of claim 1, wherein the step of receiving an indication comprises one of:
    receiving an acknowledgment that the message passed through the firewall; and
    timing out responsive to the message not passing through the firewall.

3. The method of claim 1, wherein the step of determining the functionality of the firewall, further comprising comparing the transmitted message to the received indication.

4. The method of claim 3, further comprising:
    updating a valid message counter if an acknowledgement is received for a valid message sent;
    updating the valid message counter if a time out is determined for an invalid message sent;
    updating an invalid message counter if the acknowledgement is received for the invalid message sent; and
    updating the invalid message counter if the time out is determined for the valid message sent.

5. The method of claim 1, further comprising:
    prior to the transmitting:
        packetizing the plurality of the valid and invalid messages; and
        updating a valid packet counter and an invalid packet counter based on the packetizing the plurality of the valid and invalid messages.

6. The method of claim 1, wherein the generating the percentage of the valid and invalid messages from the plurality of the valid message types further comprising automatically and iteratively generating the percentage of the valid and invalid messages from the plurality of the valid message types over a period of time.

7. The method of claim 1, wherein the generating the percentage of the valid and invalid messages from the plurality of the valid message types further comprising generating the percentage of the valid and invalid messages from the plurality of the valid message types based on an illegal payload format, an illegal header format, or any combination thereof associated with the plurality of valid message types.

8. The method of claim 1, wherein the step of generating the percentage of the valid and invalid messages comprising inserting an illegal packet bit into a valid message to form an invalid message.

9. The method of claim 1, wherein the step of generating the percentage of the valid and invalid messages comprising:
    selecting a message type from a plurality of stored message types based on a random number; and
    generating an invalid message based on the selected message type and the random number.

10. A computer program product, tangibly embodied in a machine-readable storage device, the computer program product including instructions being operable to cause a data processing apparatus to:
    select a plurality of valid message types;
    generate a percentage of valid and invalid messages from the plurality of valid message types;
    transmit the plurality of valid and invalid messages to the firewall;
    receive an indication of the firewall's handling of valid and invalid messages based on the transmitted message; and
    determine the functionality of the firewall from the received indication.

11. A system for testing functionality of a firewall, the system comprising:
    a message type selection module configured to select a plurality of valid message types;
    a message generation module configured to generate a percentage of valid and invalid messages from the plurality of valid message types;
    a communication module configured to:
        transmit the plurality of valid and invalid messages to the firewall;

receive an indication of the firewall's handling of valid and invalid messages based on the transmitted message; and a functionality determination module configured to determine the functionality of the firewall from the received indication.

12. The system of claim 11, wherein the communication module further configured to:
receive an acknowledgment that the message passed through the firewall; and
time out a response to the message, the time out of the response indicative of the message not passing through the firewall.

13. The system of claim 11, wherein the functionality determination module further configured to compare the transmitted message to the received indication.

14. The system of claim 13, further comprising:
a valid message counter module configured to:
update a valid message counter if an acknowledgement is received for a valid message sent, and
update the valid message counter if a time out is determined for an invalid message sent; and
an invalid message counter module configured to:
update an invalid message counter if the acknowledgement is received for the invalid message sent, and
update the invalid message counter if the time out is determined for the valid message sent.

15. The system of claim 11, wherein the communication module further configured to:
prior to the transmitting:
packetize the valid and invalid message; and
update a valid packet counter and an invalid packet counter.

16. The system of claim 11, wherein the message generation module further configured to automatically and iteratively generate the percentage of the valid and invalid messages from the plurality of the valid message types over a period of time.

17. The system of claim 11, wherein the message generation module further configured to generate the percentage of the valid and invalid messages from the plurality of the valid message types based on an illegal payload format, an illegal header format, or any combination thereof associated with the plurality of valid message types.

18. The system of claim 11, wherein the message generation module further configured to insert an illegal packet bit into the valid message to form the invalid message.

19. The system of claim 11,
wherein the message type selection module further configured to select a message type from a plurality of stored message types based on a random number; and
wherein the message generation module further configured to generate an invalid message based on the selected message type and the random number.

20. The system of claim 11, wherein the firewall comprises a network edge protection device, an email gateway, a cross-domain device, a packet filter device, an application gateway, a proxy server, or any combination thereof.

21. A system for testing functionality of a firewall, the system comprising:
means for selecting a plurality of valid message types;
means for generating a percentage of valid and invalid messages from the plurality of valid message types;
means for transmitting the plurality of valid and invalid messages to the firewall;
means for receiving an indication of the firewall's handling of valid and invalid messages based on the transmitted message; and
means for determining the functionality of the firewall from the received indication.

* * * * *